(12) United States Patent
Labrozzi et al.

(10) Patent No.: US 9,060,201 B2
(45) Date of Patent: Jun. 16, 2015

(54) STREAM SYNCHRONIZATION FOR LIVE VIDEO ENCODING

(75) Inventors: Scott C. Labrozzi, Cary, NC (US); Philip G. Jacobsen, Durham, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1054 days.

(21) Appl. No.: 13/062,120

(22) PCT Filed: Oct. 27, 2009

(86) PCT No.: PCT/US2009/062206
§ 371 (c)(1),
(2), (4) Date: Jun. 16, 2011

(87) PCT Pub. No.: WO2010/062596
PCT Pub. Date: Jun. 3, 2010

(65) Prior Publication Data
US 2011/0235703 A1  Sep. 29, 2011

Related U.S. Application Data

(60) Provisional application No. 61/108,946, filed on Oct. 28, 2008.

(51) Int. Cl.
*H04N 7/26* (2006.01)
*H04N 21/44* (2011.01)
(Continued)

(52) U.S. Cl.
CPC ... *H04N 21/44016* (2013.01); *H04N 21/23424* (2013.01); *H04N 21/234363* (2013.01);
(Continued)

(58) Field of Classification Search
CPC .................................................. H04N 7/36

USPC ............. 375/240.02; 709/219, 231; 386/241; 382/232
See application file for complete search history.

(56) References Cited

U.S. PATENT DOCUMENTS 5,479,209 A * 12/1995 Miyazaki ................. 375/240.25
6,075,576 A * 6/2000 Tan et al. ................... 348/425.4
(Continued)

FOREIGN PATENT DOCUMENTS

EP          1 657 835 A1    5/2006
WO     WO 00/76222 A1    12/2000
(Continued)

OTHER PUBLICATIONS

PRC 2013-12-23 SIPO First Office Action from Chinese Application No. 2009801538273.
(Continued)

*Primary Examiner* — Jay Au Patel
*Assistant Examiner* — Neil Mikeska
(74) *Attorney, Agent, or Firm* — Patent Capital Group

(57) ABSTRACT

Methods of encoding a live video signal in a video encoding system including a plurality of video capture and encoding subsystems include providing the live video signal and an associated time code signal to the plurality of video capture and encoding subsystems, starting video capture and encoding in a first one of the subsystems at a first frame of the live video signal, starting video capture and encoding in a second one of the subsystems at a second frame of the live video signal that is later than the first frame, generating encode frame timestamps for the second frame in both the first and second video capture and encoding subsystems that are synchronized across the first and second subsystems, and associating the encode frame timestamp with the second frame in both the first and second subsystems. Related systems are also disclosed.

24 Claims, 9 Drawing Sheets

(51) Int. Cl.
*H04N 21/234* (2011.01)
*H04N 21/2343* (2011.01)
*H04N 21/2365* (2011.01)
*H04N 21/242* (2011.01)
*H04N 21/434* (2011.01)
*H04N 21/8547* (2011.01)

(52) U.S. Cl.
CPC ..... *H04N21/23439* (2013.01); *H04N 21/2365* (2013.01); *H04N 21/242* (2013.01); *H04N 21/4347* (2013.01); *H04N 21/8547* (2013.01)

(56) References Cited

U.S. PATENT DOCUMENTS

| | | | | |
|---|---|---|---|---|
| 2001/0018693 | A1* | 8/2001 | Jain et al. | 707/500 |
| 2002/0034255 | A1* | 3/2002 | Zetts | 375/240.26 |
| 2002/0035732 | A1* | 3/2002 | Zetts | 725/148 |
| 2002/0116361 | A1* | 8/2002 | Sullivan | 707/1 |
| 2002/0146075 | A1* | 10/2002 | Kauffman et al. | 375/240.28 |
| 2007/0297757 | A1* | 12/2007 | Kauffman et al. | 386/55 |
| 2008/0086570 | A1* | 4/2008 | Dey et al. | 709/231 |
| 2010/0091888 | A1* | 4/2010 | Nemiroff | 375/240.28 |

FOREIGN PATENT DOCUMENTS

| | | |
|---|---|---|
| WO | WO 03/084118 A1 | 10/2003 |
| WO | WO 2008/065317 A1 | 6/2008 |

OTHER PUBLICATIONS

International Search Report and Written Opinion of the International Searching Authority, PCT Application No. PCT/US2009/062206, Feb. 24, 2010.
International Preliminary Report on Patentability of PCT Application No. PCT/US2009/062206, May 3, 2011.
SMPTE Standard 12M-1999, Revision of ANSI/SMPTE 12M-1999. "SMPTE Standard for Television, Audio and Film—Time and Control Code" SMPTE; The Society of Motion Picture and Television Engineers, White Plains, NY, No. 12M-1999; Sep. 1, 1999; 21 pages.

* cited by examiner

STREAM SYNCHRONIZATION FOR LIVE VIDEO ENCODING

CROSS REFERENCE TO RELATED APPLICATION AND CLAIM OF PRIORITY

The present application is a 35 U.S.C. §371 national phase application of PCT Application PCT/US2009/062206, filed Oct. 27, 2009, and published in English on Jun. 3, 2010, as International Publication No. WO 2010/062596, which claims the benefit of and priority to U.S. Provisional Patent Application No. 61/108,946, filed Oct. 28, 2008, entitled "LIVE VIDEO ENCODER STREAM SYNCHRONIZATION," the disclosures of which are hereby incorporated herein by reference in their entirety.

FIELD OF THE INVENTION

The present invention relates to video coding and, more particularly, the present invention relates to systems and/or methods for encoding live video streams.

BACKGROUND

The speed of consumer broadband internet access varies widely. In September 2008, a leading DSL provider in the United States offered consumers four DSL options ranging from maximum download speeds of 768 Kb/s to 6 Mb/s. During the same period a leading cable provider offered cable modem service with maximum download speeds ranging from 768 Kb/s to 10 Mb/s. In both these cases, the quoted download speeds are maximum rates and are not guaranteed. Furthermore, download speeds are generally not guaranteed to be sustainable for any duration of time.

The delivery of quality video assets over a data communication network, such as the Internet is hindered by both the wide variation in consumer broadband internet access speeds as well as the fact that for any given consumer, a download rate is not guaranteed to be sustainable at a consistent or known rate. These limitations have forced producers of on-line video content to produce a given video asset at a number of data rates (also referred to as bit rates or encoding rates) that can be offered as alternatives to consumers. When consumers opt to watch on-line video content, they are given the choice to select among versions of the content having different bit rates. A consumer may then choose to watch the content at the highest bit rate that is less than their known maximum data rate. For example, during 2008, a major sports broadcaster produced, for each game, live content at bit rates of approximately 1.21 Mb/s, 800 Kb/s and 400 Kb/s.

Typically, the higher the encoded bit rate, the higher the video quality. The overall quality of consumers' viewing experiences has been hindered, because consumers typically have to choose from amongst a small set of data rates, and because among these rates, the consumers must choose one that happens to be less than their expected sustainable broadband internet download speed. If the consumer's download speed is not sustained at a speed that is at least equal to the video bit rate, then the watching experience will occasionally be interrupted by pauses as more video is fetched from the source. These pauses, often referred to as re-buffering, also impact the quality of the viewing experience. Since it is unlikely that end users will actually experience their maximum achievable download speed, they are forced to choose a bit rate much lower than their maximum download speed unless they are willing to suffer periodic stream re-buffering. The implication of having to choose a lower video bit rate means that a consumer's actual download capacity may not be fully utilized, and therefore the quality of video service may not be maximized.

Adaptive Streaming is a technique that attempts to optimize a consumer's actual bit rate from moment to moment. The technique involves encoding a given video asset at a range of video bit rates. During the consumer's playback, the delivery system dynamically switches between the various rates depending on the actual download speeds the consumer experiences while watching the content. In this scenario, the consumer does not have to initially choose a lower quality video experience. The consumer simply chooses to watch a given video asset, and the best quality video stream that is achievable based on their momentary download speed is dynamically delivered to them. If their download speed goes down, the video stream that is being delivered to them is switched to a lower bit rate stream. If the consumer's download speed goes up, a higher bit rate stream is delivered.

A digital video signal, also known as a video stream, includes a sequence of video frames. Each frame has a timestamp associated with it describing the time when the frame is to be displayed relative to other frames in the stream. When two streams of the same video signal having different bit rates are provided, as in Adaptive Streaming, switching between streams should be seamless, such that frames continue to be displayed in the proper order and are displayed at the time specified in the timestamp. In order to cleanly switch to a new stream, a frame-accurate relationship should exist between the current stream and the new stream. That is, proper display of the video signal requires knowledge of the next frame in the new stream. Thus, if a delivery system is currently displaying frame N of a stream, the delivery system needs to know where frame N+1 exists in the new stream to be switched to. Having a frame-accurate relationship between video streams means that there is a frame-to-frame correspondence between frames in multiple different video streams that are generated from the same input source but that may have different encoding parameters, such as bit rate, picture size, etc.

The task of having a frame-accurate relationship is simple when the source video asset being encoded is a file based asset, meaning that all frames already exist on a storage medium, such as a hard disk. A file asset has a fixed set of frames and timestamps associated with those frames. The asset can be encoded many times, perhaps even on different machines, and, in each output file, a given frame N will have the same timestamp in the encoded output.

For example, referring to FIG. 1, a source video file asset 10 including M frames is encoded by a first encoding system 12A and a second encoding system 12B. The first encoding system 12A encodes the source video 10 into a first encoded video asset 20A including M frames and the second encoding system 12B encodes the source video 10 into a second encoded video asset 20B, also including M frames. The M frames of the first encoded video asset 20A correspond to the M frames of the second encoded video asset 20B on a frame-by-frame basis with identical timestamps.

A live asset, such as a live video feed, does not have a fixed set of frames and timestamps associated with those frames. However, when the capture of live video starts, it is typical for the first frame captured to be considered frame 1 having a timestamp of 0. Thereafter frame numbering and timestamps increment just as if the asset was from a file. For example, FIG. 2 illustrates capture of video from a live video source. Referring to FIG. 2, capture started at frame A+1 of the source live stream. The first captured frame in the captured video file is typically referred to as frame 1 and has a timestamp of 0.

The task of having a frame-accurate relationship is therefore straightforward when the source video asset being encoded is live and where the frames feeding multiple encoders are sourced from a single capture system. The overall encoding architecture can be a single system including multiple encoders (as illustrated in FIG. 3) or multiple encoding systems (as illustrated in FIG. 3) but in each case there remains a single capture source for the video frames. In the systems illustrated in both FIG. 3 and FIG. 4, a captured video stream is encoded at different bit rates using first and second encoders (Encode 1 and Encode 2). In the system of FIG. 3, the two encoders are implemented in a single capture and encoding system, while in FIG. 4, the two encoders are implemented as separate encoding systems that receive captured video frames from a single common capture system.

The quality and/or scalability of an adaptive streaming model may be directly related to the number of encoding rates that can be produced for a given asset. For example, producing just three encoding rates such as 200 Kb/s, 800 Kb/s and 1.4 Mb/s (e.g., 600 Kb/s spacing between encoding rates) is not as scalable as having 5 rates at 200 Kb/s, 500 Kb/s, 800 Kb/s, 1.1 Mb/s and 1.4 Mb/s (300 Kb/s spacing) which is not as scalable as having 9 rates at 200 Kb/s, 350 Kb/s, 500 Kb/s, 650 Kb/s, 800 Kb/s, 950 Kb/s, 1 Mb/s, 1.25 Mb/s and 1.4 Mb/s (150 Kb/s spacing). More bit rates are better from a playback standpoint, because the visual transitions between streams may be less noticeable.

The number of output streams in the single live encoding system illustrated in FIG. 3 is limited by the overall processing capabilities of the encoding system (processor, memory, I/O, etc). This system architecture also does not handle failure well. If a fault occurs at the single live capture system, all of the output streams may be lost.

At first glance, the system depicted in FIG. 4 offers apparent infinite scalability and more robust failure handling. Any number of encoders can be added to the architecture, and if a single system fails, only a single adaptive stream is lost, although if the single capture system fails, like the architecture of, all adaptive streams may be lost. However, since there is a single capture system providing frames and associated timestamps, this architecture does allow for restart of a failed system. The restarted system can start encoding again and start providing streams that are frame-accurate relative to streams generated by the other encoders.

However, in practice, the architecture shown in FIG. 4 may be impractical, as it relies on a single capture system feeding uncompressed captured video to multiple encoding systems. Uncompressed video is very large (HD uncompressed video in 4:2:2, 8-bit format requires nearly 1 Gb/sec for transmission), and the network requirements to deliver uncompressed video feeds to a scalable number of encoding machines are not practical.

A modified system architecture is illustrated in FIG. 5. This architecture uses common live encoding systems (Live Encoding System 1 and Live Encoding System 2) that are not fed uncompressed video from a single capture system. If a single capture and encoding system fails, then a subset of adaptive streams may be lost. There is also no single point of failure in the capture and encoding components that impacts all adaptive streams. However, this architecture still has a variety of limitations. For example, in order to have a frame-accurate relationship among encoded outputs, each live encoding system must start encoding on exactly the same frame. By doing so, frame N of one output will be the same frame N in another output. If the encoding systems do not start synchronously with each other, this requirement will not be met.

Starting capture at a specific time code can solve the problem of synchronous start across multiple encoders, because all encoders start on exactly the same frame. However, such a method precludes the possibility of a system restarting after failure.

SUMMARY

Some embodiments provide methods of encoding a live video signal in a video encoding system including a plurality of video capture and encoding subsystems. The methods include providing the live video signal and an associated time code signal to the plurality of video capture and encoding subsystems, starting video capture and encoding in a first one of the plurality of video capture and encoding subsystems at a first frame of the live video signal, starting video capture and encoding in a second one of the plurality of video capture and encoding subsystems at a second frame of the live video signal that is later than the first frame, generating encode frame timestamps for the second frame in both the first and second video capture and encoding subsystems that are synchronized across the first and second video capture and encoding subsystems, and associating the encode frame timestamp with the second frame in both the first and second video capture and encoding subsystems.

Generating the encode frame timestamp in the second video capture and encoding subsystem may include receiving a time code associated with the second frame of the live video signal, generating a frame count for the second frame in response to the time code, generating a base timestamp in response to the frame count, generating a capture timestamp for the second frame, and storing the capture timestamp for the second frame as an initial capture timestamp.

The methods may further include generating a capture timestamp for a third frame received by the second video capture and encoding subsystem after the second frame, generating an encode frame timestamp for the third frame in response to the capture timestamp of the third frame, the initial timestamp and the base timestamp, and encoding the third frame in the second video capture and encoding subsystem using the encode frame timestamp for the third frame.

The encode frame timestamp for the third frame may be generated according to the equation:

encode frame timestamp=base timestamp+(capture timestamp−initial timestamp).

The methods may further include determining if the second frame is frame aligned with a group of pictures of an encoded video signal generated by the first video capture and encoding subsystem in response to the live video signal, and in response to determining that the second frame is not frame aligned with the group of pictures of the encoded video signal generated by the first video capture and encoding subsystem, discarding the second frame and receiving a subsequent frame in the live video signal.

The first and second video capture and encoding subsystems are configured to encode the live video signal using different encoding parameters.

Generating the frame count for the second frame may include generating the frame count in response to the time code associated with the second frame, a base time code, and a video frame rate.

The methods may further include adjusting the frame count to account for use of a drop time code. Adjusting the frame count may include adjusting the frame count according to the following equation:

Frame Count=Frame Count−2*Total Minutes+2*(Total Minutes/10)

where Total Minutes represents the total number of minutes from the base time code to the time code associated with the second frame.

The time code associated with the second frame may include a linear time code (LTC).

A video encoding system according to some embodiments includes first and second video capture and encoding subsystems. Each of the first and second video capture and encoding subsystems is configured to receive a live video signal and an associated time code signal and includes a capture subsystem, an adaptive synchronization subsystem, and at least one encoding subsystem. The first video capture end encoding subsystem is configured to start video capture and encoding at a first frame of the live video signal, and the second video capture end encoding subsystem is configured to start video capture and encoding at a second frame of the live video signal that is later than the first frame. The first and second video capture and encoding subsystems are configured to generate respective encode frame timestamps for the second frame in both the first and second video capture and encoding subsystems that are synchronized across the first and second video capture and encoding subsystems and to encode the second frame using the encode frame timestamp.

The adaptive synchronization subsystem of the second video capture and encode subsystem may be configured to receive a time code associated with the second frame of the live video signal, to generate a frame count for the second frame in response to the time code, to generate a base timestamp in response to the frame count, to generate a capture timestamp for the second frame, and to store the capture timestamp for the second frame as an initial capture timestamp.

The adaptive synchronization subsystem of the second video capture and encode subsystem may be further configured to generate a capture timestamp for a third frame received by the second video capture and encoding subsystem after the second frame, and to generate an encode frame timestamp for the third frame in response to the capture timestamp of the third frame, the initial timestamp and the base timestamp, and the encoding subsystem of the second video capture and encode subsystem is configured to encode the third frame using the encode frame timestamp for the third frame.

The adaptive synchronization subsystem of the second video capture and encode subsystem may be configured to generate the encode frame timestamp for the third frame according to the equation:

encode frame timestamp=base timestamp+(capture timestamp−initial timestamp).

The adaptive synchronization subsystem of the second video capture and encode subsystem may be further configured to determine if the second frame is frame aligned with a group of pictures of an encoded video signal generated by the first video capture and encoding subsystem in response to the live video signal, and in response to determining that the second frame is not frame aligned with the group of pictures of the encoded video signal generated by the first video capture and encoding subsystem, to discard the second frame and receiving a subsequent frame in the live video signal.

The first and second video capture and encoding subsystems may be configured to encode the live video signal using different encoding parameters.

The adaptive synchronization subsystem of the second video capture and encode subsystem may be configured to generate the frame count for the second frame in response to the time code associated with the second frame, a base time code, and a video frame rate.

The adaptive synchronization subsystem of the second video capture and encode subsystem may be further configured to adjust the frame count to account for use of a drop time code.

The adaptive synchronization subsystem of the second video capture and encode subsystem may be further configured to adjust the frame count may include adjusting the frame count according to the following equation:

Frame Count=Frame Count−2*Total Minutes+2*(Total Minutes/10)

where Total Minutes represents the total number of minutes from the base time code to the time code associated with the second frame.

The time code associated with the second frame may include a linear time code (LTC).

Methods of encoding a live video signal in a video encoding system including a plurality of video capture and encoding subsystems according to further embodiments include providing the live video signal and an associated time code signal to the plurality of video capture and encoding subsystems, starting video capture and encoding in a first one of the plurality of video capture and encoding subsystems at a first frame of the live video signal, starting video capture and encoding in a second one of the plurality of video capture and encoding subsystems at a second frame of the live video signal that is later than the first frame, determining at the second video capture and encoding subsystem if the second frame of the live video signal is the first frame of a group of pictures being encoded by the first video capture and encoding subsystem, and in response to determining that the second frame of the live video signal is not the first frame of a group of pictures being encoded by the first video capture and encoding subsystem, discarding the second frame of the live video signal and receiving a third frame of the live video signal.

The methods may further include, in response to determining that the second frame of the live video signal is the first frame of the group of pictures being encoded by the first video capture and encoding subsystem, generating an encode frame timestamp for the second frame in the second video capture and encoding subsystem, and associating the encode frame timestamp with the second frame in the second video capture and encoding subsystem.

Generating the encode frame timestamp for the second frame of the live video signal may include generating a frame count associated with the second frame of the live video signal and generating the encode frame timestamp in response to the frame count.

Determining if the second frame of the live video signal is the first frame of a group of pictures (GOP) being encoded by the first video capture and encoding subsystem may include generating a frame count associated with the second frame of the live video signal and performing a modulus operation on the frame count and a GOP size.

DESCRIPTION OF EMBODIMENTS

Figure 1:
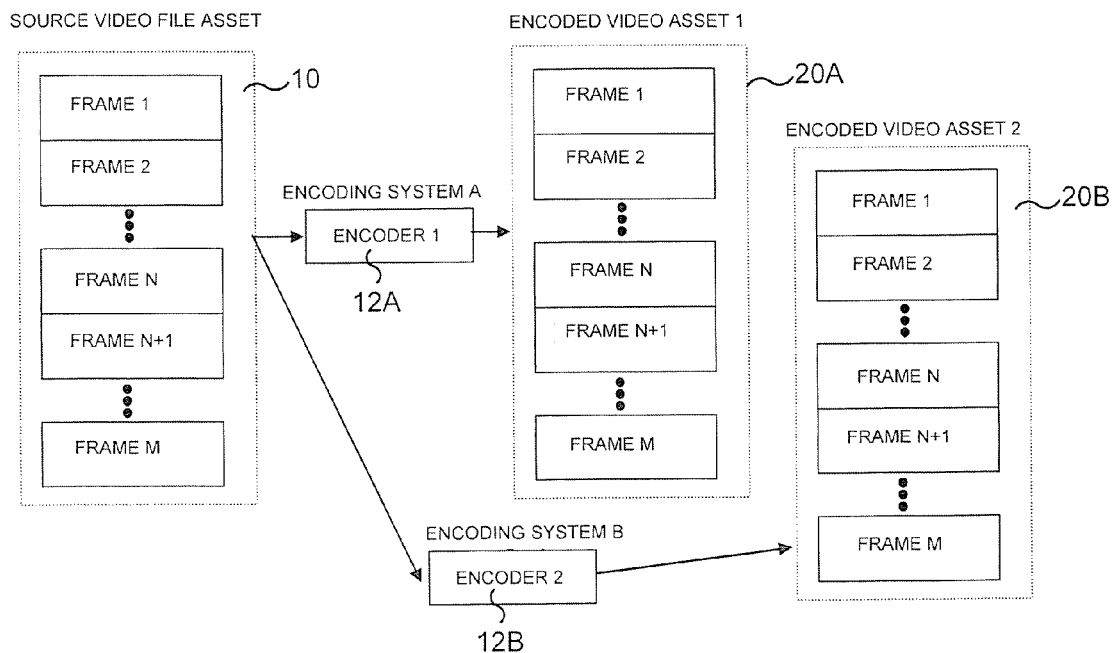
FIG. 1 is a block diagram that illustrates a conventional video encoding system.
Figure 2:
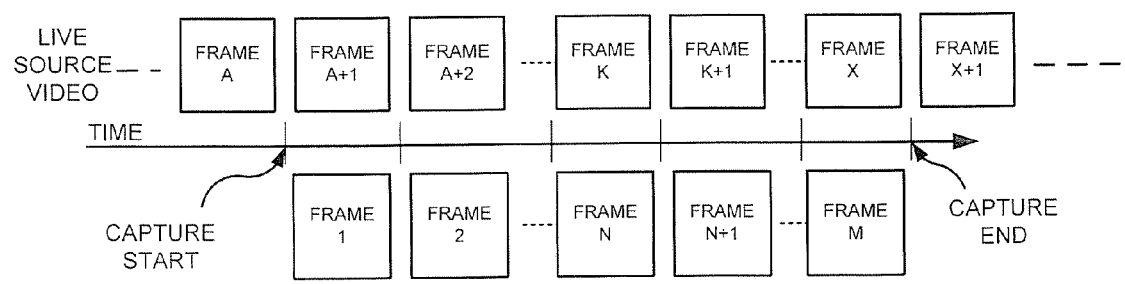
FIG. 2 illustrates frame by frame capture of a live video signal.
Figure 3:
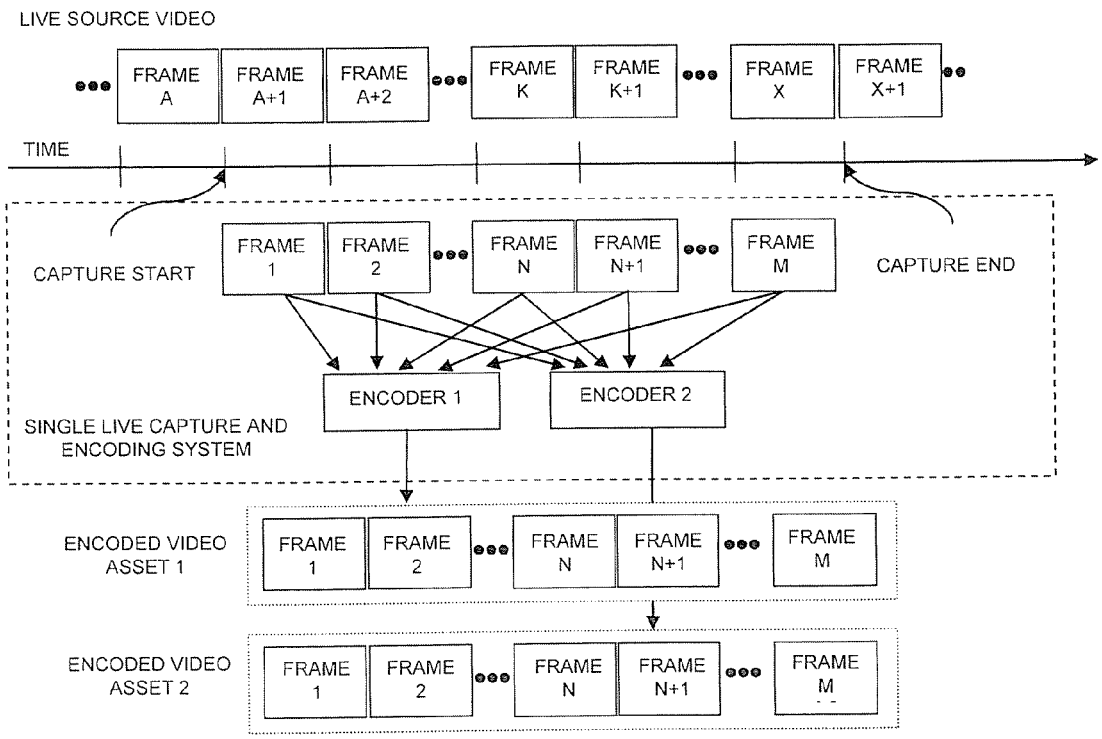
FIG. 3 is a block diagram that illustrates a conventional capture and encoding system including a single capture subsystem and multiple encoders.
Figure 4:
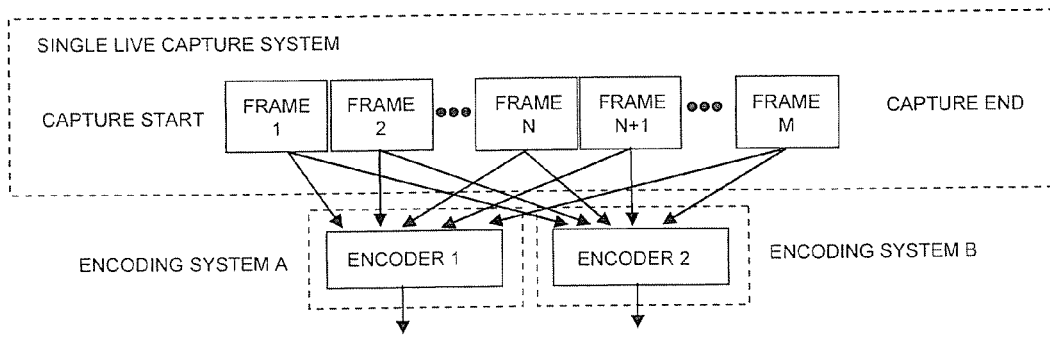
FIG. 4 is a block diagram that illustrates a conventional capture and encoding system including a single live capture system and multiple encoders that are separate from the capture system.
Figure 5:
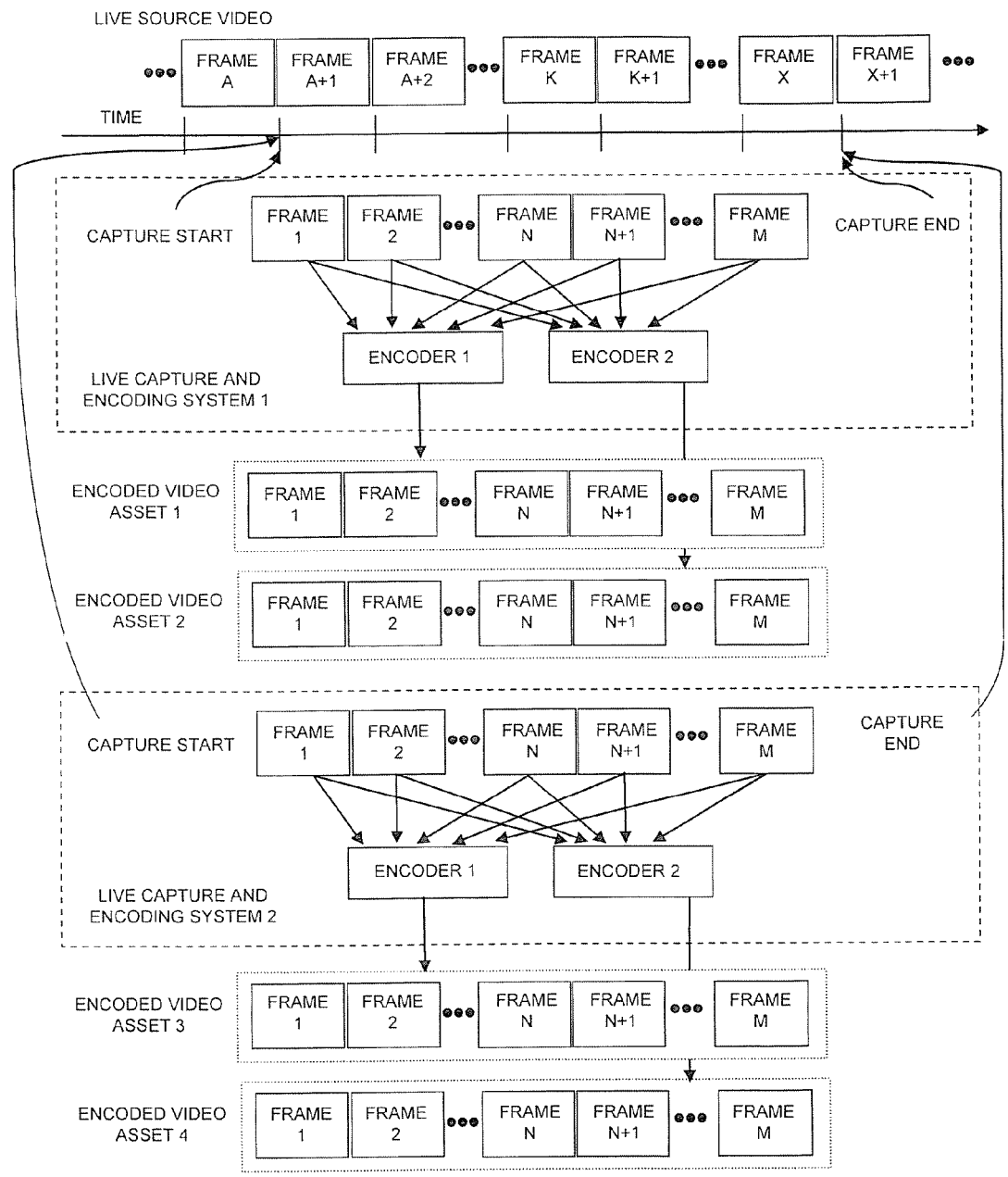
FIG. 5 is a block diagram that illustrates a conventional capture and encoding system including multiple live capture subsystems with multiple encoders each.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Some embodiments described herein address these issues by allowing two or more live encoding systems to start asynchronously from each other while maintaining a frame-accurate, time-based association of output frames from one encoding system to another. Being able to start asynchronously may permit restart and recovery after a system failure.

In general, an adaptive streaming technique cannot simply switch from one encoded stream to another on any arbitrary frame N. This is because video encoding involves compression. To accomplish video compression, some frames are encoded using information from previous and/or future frames.

Figure 6:
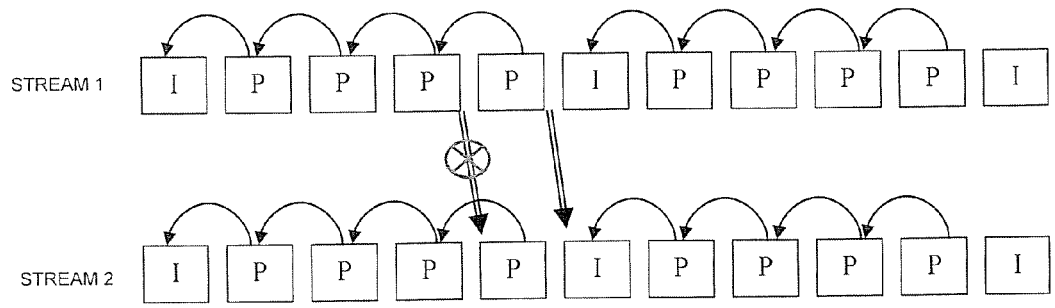
FIG. 6 illustrates switching between video streams including only I- and P-frames.

FIG. 6 depicts video streams (Stream 1 and Stream 2) containing I-frames (frames that do not depend on other frames) and P-frames (frames that depend on one or more previous frames). When switching between stream 1 and stream 2, the switch point cannot occur at a point where the next frame of stream 2 is a P-frame, because that frame depends on previous frames of stream 2 that have not been delivered. The switch point must be at an I-frame of stream 2, since the I-frame of a new stream does not depend on other frames in its stream.

Figure 7:
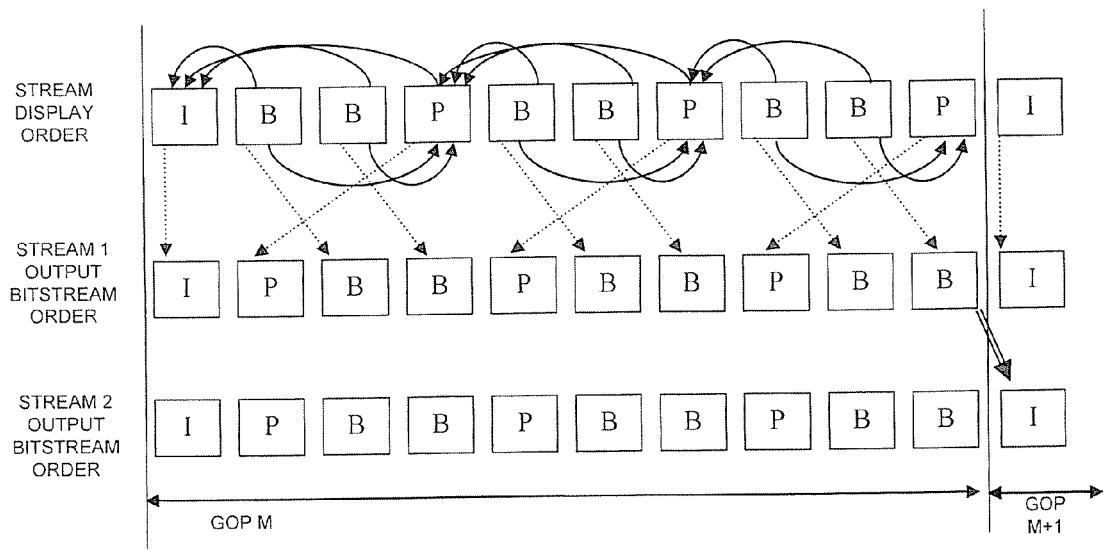
FIG. 7 illustrates switching between GOP-aligned video streams including P- and B-frames.

FIG. 7 depicts video streams (Stream 1 and Stream 2) containing I-frames, P-frames and B-frames (frames that depend on one or more previous and future frames). Furthermore, this is a special case where the Group of Pictures (GOP) is considered closed because in bitstream order (i.e., the order in which frames are transmitted, which is different from the order in which they are displayed) there are no encoded frames that depend on frames from the previous and following GOPs. In the field of video encoding, this closed GOP nature is a restriction required for the ability to switch or splice streams at GOP I-frame boundaries. As in the previous example a clean switch must be at an I-frame GOP boundary since the I-frame of a new stream does not depend on other frames in its stream and because of the closed GOP nature, future frames of the switched stream do not depend on frames that are prior to the I-frame either.

When encoding systems produce only I-frames and P-frames, no special GOP relationship has to exist among streams. When switching to a new stream, the switch has to simply be to an I-frame.

Figure 8:
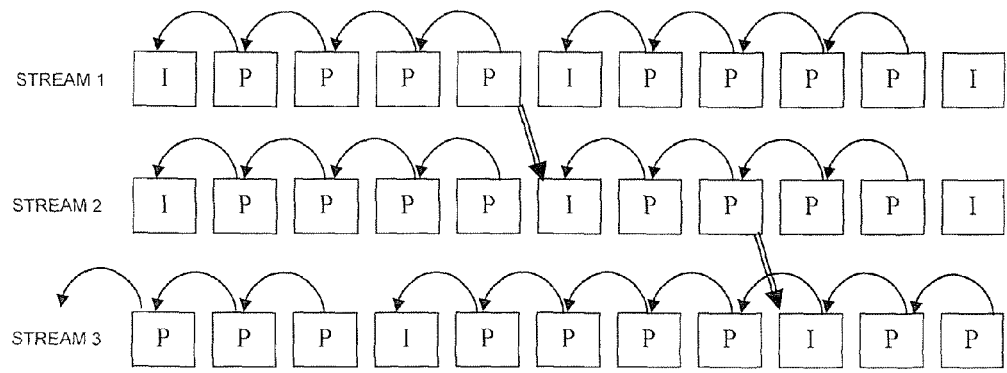
FIG. 8 illustrates GOP-aligned and unaligned switching for video streams including, only I- and P-frames.

In FIG. 8, Stream 1 and Stream 2 include only I-frames and P-frames, so the bitstream order of the streams is the same as the display order. Stream 1 and Stream 2 have aligned GOPs. However, Stream 3 is different (its I-frames are not on the same frames as the I-frames of Stream 1 and 2). It is permissible to switch, for example, from Stream 2 to Stream 3 as shown in FIG. 8, as switching is simply to an I-frame of a new stream.

Figure 9:
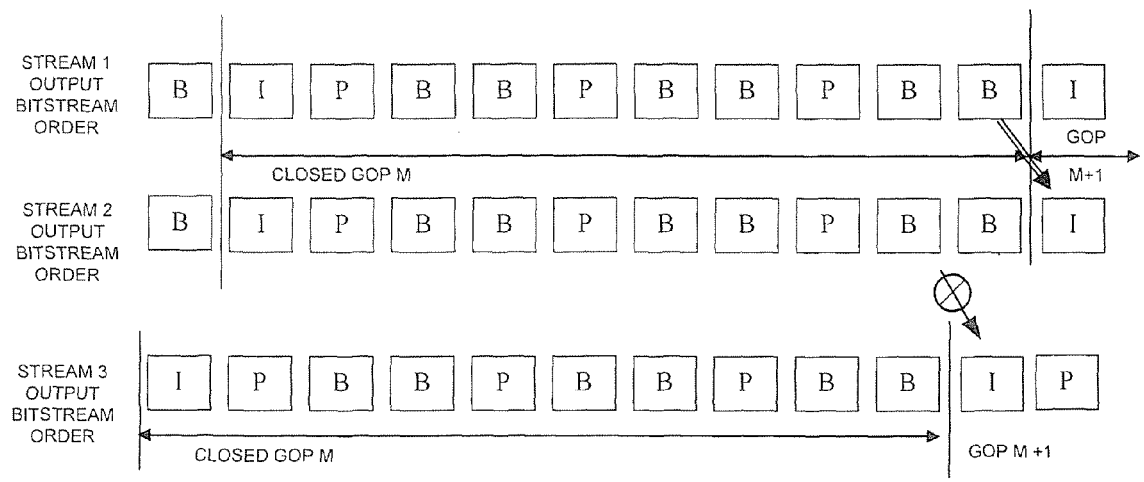
FIG. 9 illustrates GOP-aligned switching for video streams including I-, P- and B-frames.

When encoding, systems produce streams with B-frames, to cleanly switch from frame N of one stream to N+1 of another stream, the streams have to be closed GOP aligned at the switch point. That is, the I-frames must occur at the same point in both streams. In FIG. 9, switching from Stream 1 to Stream 2 is permissible, but switching to Stream 3 is not permissible, because the GOP of Stream 3 is not aligned with that of the other streams.

Thus, in addition to providing systems/methods allowing live encoding systems to start asynchronously from each other while maintaining a frame-accurate, time-based association of output frames, some embodiments further provide systems/methods for causing these output streams to be GOP aligned with one another.

Some embodiments of the invention provide systems/methods for generating a frame accurate timestamp that is synchronized across two or more encoding systems, and applying the frame-accurate timestamp to encoded video frames in multiple output streams. Some embodiments use multiple capture and encoding systems to process a live video stream to generate a plurality of encoded video assets that are encoded using different encoding parameters (bit rate, image size, etc.) but that are encoded with a common frame-accurate timestamp that is the same from asset to asset.

Some embodiments generate the common timestamps in response to time codes that are provided along with a video signal. Two examples of time codes that can be provided with a video signal are VITC (Vertical Interval Time Code), which is embedded in the video signal and LTC (Linear Time Code), which is external but synchronous to the video signal. Other forms of time code can be used as long as they are frame accurate. Among other things, VITC and LTC time codes provide information about the hour, minute, seconds and frame number for a given frame.

In a "Non-drop" time code, the time code increments once for every frame. For video rates that are an integer number of frames per second, a non-drop time code can exactly represent the time of a video frame. However, many video encoding formats do not encode frames at an exact integer number of frames per second. Thus, another form of time code, called a "Drop" time code, is often used. A Drop time code drops frame counts from time to time. For example, a Drop time code may drop two frame counts every minute except on the 10th minute. This helps to account for non-integer frame rates. However, each time code still does not exactly represent the real time of every given frame. Some embodiments of the invention account for this and work both for Drop and Non-Drop time codes. For the purposes of the following discussion an LTC time code will be used. However, it will be appreciated that a VITC time code or other time code may be used in some embodiments.

Figure 10:
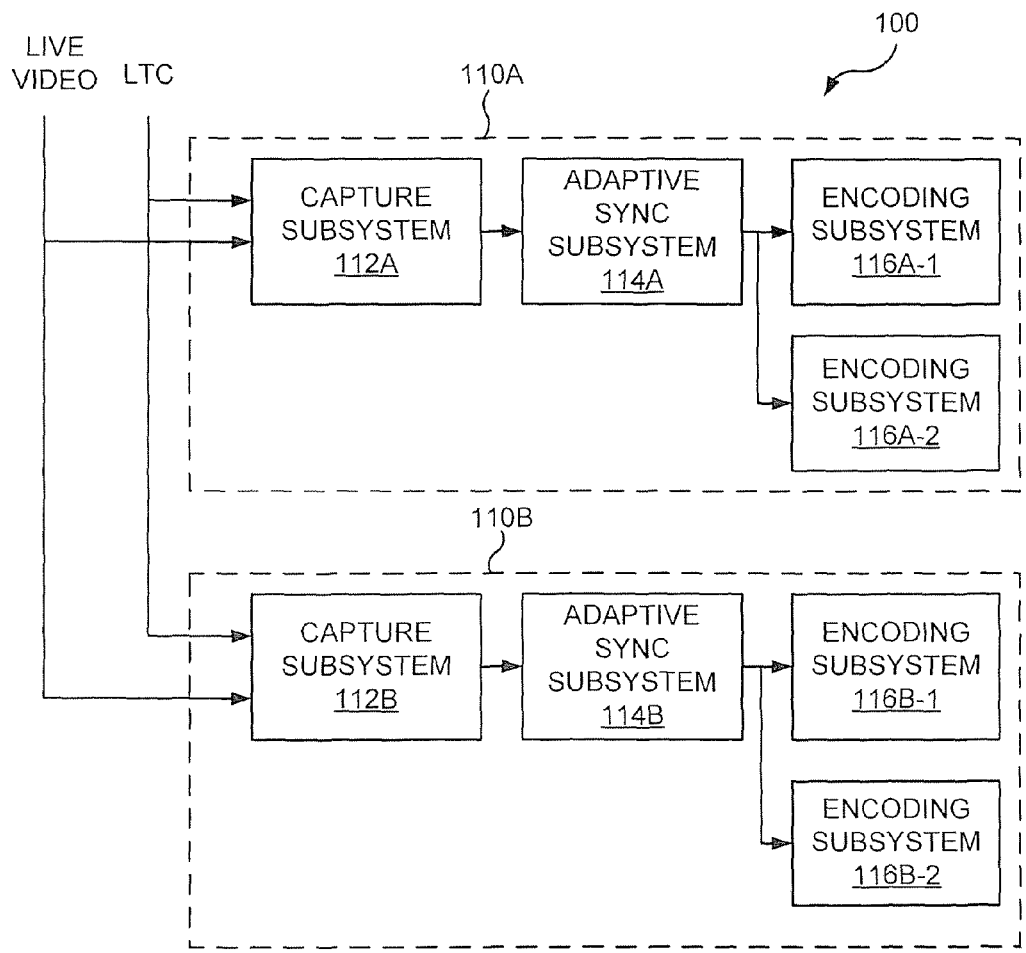
FIG. 10 is a block diagram that illustrates a live video capture and encoding system according to some embodiments.

As shown in FIG. 10, a capture and encoding system 100 according to some embodiments includes one or more capture and encoding subsystems 110A, 110B. Each capture and encoding subsystem 110A, 110B includes a capture subsystem 112A, an adaptive synchronization subsystem 114A, 114B for each capture subsystem, and one or more encoding subsystems 116A-1, 116A-2, 116B-1, 116B-2 for each capture subsystem. Each capture and encoding subsystem 110A, 110B may be implemented, for example, using a programmable digital computer including a memory, a processor, and appropriate communication interfaces for receiving a video signal and an associated time code. An encoded video signal generated by the capture and encoding subsystem 110A, 110B may be output by the capture and encoding subsystem 110A, 110B, stored in a memory or other storage system, or both. Although two capture subsystems and associated adaptive sync and encoding subsystems are illustrated in FIG. 10, it will be appreciated that more than two capture subsystems could be provided according to some embodiments. Furthermore, although two encoding subsystems are illustrated per capture subsystem in FIG. 10, it will be appreciated that more than two encoding subsystems per capture subsystem could be provided according to some embodiments.

Each capture and encoding system receives both a live video signal and a time code (LTC). The LTC may be a synchronous "house time" that is provided simultaneously to each capture subsystem 112A, 112B in the capture and encoding system 100.

According to some embodiments, each encoding subsystem 116A-1, 116A-2, 116B-1, 116B-2 assigns a common frame timestamp to each encoded frame that is based on the LTC, so that the frame timestamp assigned to a frame by each encoding subsystem may be the same.

In some embodiments, rather than providing an LTC to the capture and encoding system 100, each encoding subsystem may generate the common frame timestamp based on a synchronous external clock signal, such as a clock signal provided by an atomic clock, a GPS system, or other synchronous clock source.

Figure 11:
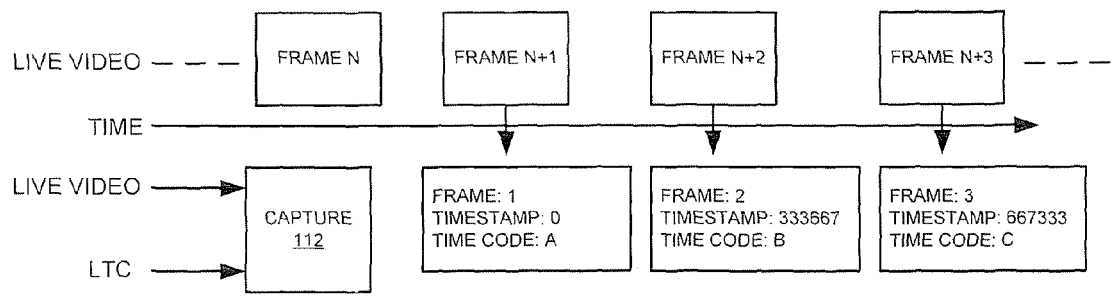
FIG. 11 illustrates assignment of timestamps and time codes for frames captured from a live video stream according to some embodiments.

FIG. 11 depicts a video capture subsystem 112 according to some embodiments. A sequence of live video frames is fed to the video capture system 112. The system is also provided time code information, such as LTC information. At some point in time, the capture system 112 starts to capture video frames. The first captured frame is referred to here as Frame 1. It has a capture timestamp of 0 and has a time code associated with it. The time code of Frame 1 is illustrated in FIG. 11 as Time Code A. However, it will be appreciated that the time code may be a numeric code in a standard time code format, such as SMPTE format, which includes fields for hours, minutes, seconds, and frames. The next frame captured is Frame 2. It also has a time code associated with it, and its timestamp represents the time it was captured referenced from time 0. Timestamps shown are in hundred-nano-second units (HNS).

To allow multiple capture/encoding systems to have synchronous streams, the timestamp of any given frame in the encoded streams according to some embodiments is the same across all streams regardless of when the systems started capture and encoding. To accomplish this, some embodiments utilize the time code supplied to the capture and encoding system and a base time code to compute the timestamp of frames to be encoded.

Figure 12:
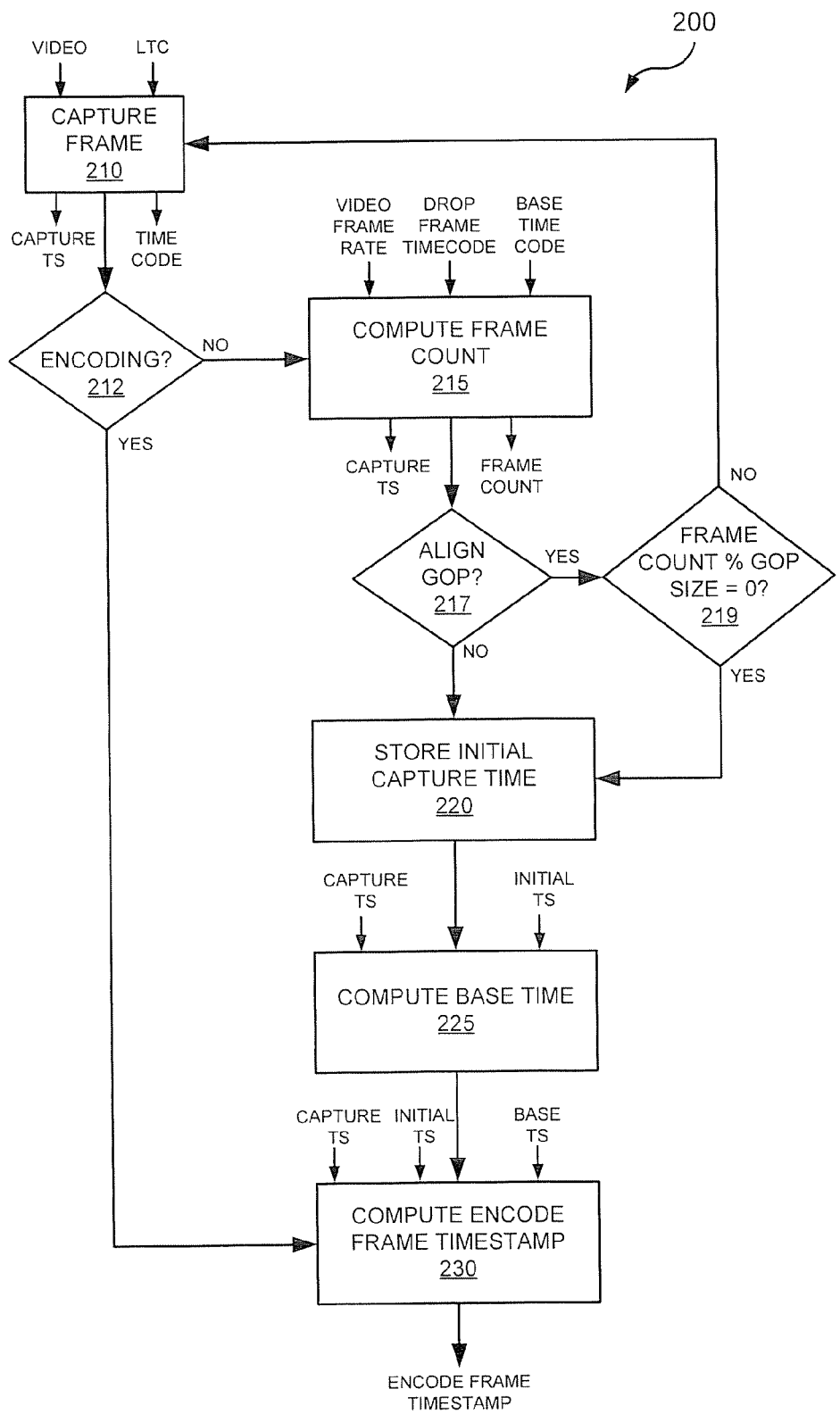
FIG. 12 is a flowchart that illustrates systems/methods for generating synchronous timestamps according to some embodiments.

Systems/methods for generating encode frame timestamps according to some embodiments are illustrated in FIG. 12. Referring to FIG. 12, when a frame is captured (Block 210), it is assigned a Capture Timestamp by the capture subsystem 112 and a time code obtained from the LTC input. If the encoders are not yet encoding video frames (as will be the case when the system first begins to capture frames), the systems/methods first compute the number of frames (Frame Count) that have been in the live stream since some specific earlier base time, represented by a base time code (Block 215). For illustrative purposes here a base time with a base time code of 0:0:0:0 on the same day is assumed (or a time code that incorporates date information may be used), although the use of other base times is possible. To compute the Frame Count, the number of seconds from the base time is calculated first using information from the LTC time code, which contains Hours. Minutes. Seconds and Frames (in addition to other data).

Total Seconds=Hours*3600+Minutes*60+Seconds (1)

Total Minutes=Total Seconds/60 (2)

The Frame Count is then computed. First, the Frame Rate, expressed as an integer number of frames per second, is calculated as follows:

(Integer) Frame Rate=(Integer)((Double) Frame Rate+ 0.5) (3)

The Frame Count is then simply the frame rate multiplied by the total number of elapsed seconds since the base time, plus the number of frames from Frames field of the time code, as follows:

Frame Count=Total Seconds*Integer Frame Rate+ Frames (4)

If the time code is not a Drop Frame Time code, then the Frame Count within a given day accurately represents the total number of frames. However, if the Time code is a Drop Frame Time code, then the Frame Count is adjusted as follows to account for the periodic frame count drops of Drop Frame Tim ecode:

Frame Count=Frame Count−2*Total Minutes+2*(Total Minutes/10) (5)

To provide for synchronous GOP structures across multiple encoding systems, a constraint is imposed on the first frame passed from the capture subsystem to the encoding subsystem. This is only needed if GOP alignment is required. This constraint is:

Frame Count mod GOP Size Must Equal 0

This ensures that the first frame that is passed to the encoding system is the first frame of a Group of Pictures.

Thus, after the Frame count is computed in Block 215, a check is made at Block 217 to see if it is necessary to align the GOPs across multiple encoded streams. If not, operations continue to Block 220. However, if GOP alignment is required, a check is made to see if the current frame is at the beginning of a GOP, by comparing the quantity (Frame Count mod GOP size) to zero. If (Frame Count mod GOP size) is zero, then the current frame is at the beginning of a Group of Pictures, and operations proceed to Block 220.

However, if (Frame Count mod GOP size) not zero (i.e., the constraint is not met), then the captured frame is ignored and the Frame Count is recalculated for the next captured frame. If the (Frame Count mod GOP size=0) constraint is not met on the first captured frame, the Capture Timestamp will not be 0 when the condition is met. To account for this, the Capture Timestamp of the first frame that meets the (Frame Count mod GOP size=0) condition is stored as the Initial Timestamp (Block 220). A Base Timestamp is also calculated at this point (Block 225):

Base Timestamp=Frame Count*10000*# of Milliseconds Per Frame (6)

That is, the Base Timestamp is established in HNS units based on the Frame Count of the first frame for which (Frame Count mod GOP size=0). Because the Base Timestamp is computed based on the total frame count since the base time while the capture and encoding system may have started (or restarted) at a point in time after the base time, the Base Timestamp may be different from the Initial Timestamp. The Base Timestamp, the Capture Timestamp and the Initial Timestamp may all be expressed in HNS units, however.

The final step is to produce the Encode Frame Timestamp (Block 230) that will be the same across all of the encoding systems for any given frame. This is computed from the current Capture Timestamp, the Initial Capture Timestamp and the Base Timestamp, as follows:

Encode Frame Timestamp=Base Timestamp+(Capture Timestamp−Initial Timestamp) (7)

That is, the Encode Frame Timestamp that is used to encode the frame is equal to the Base Timestamp plus the offset between the Capture Timestamp and the Initial Timestamp. Like the Base Timestamp, the Capture Timestamp and the Initial Timestamp, the Encode Frame Timestamp may be expressed in HNS units.

Figure 13A:
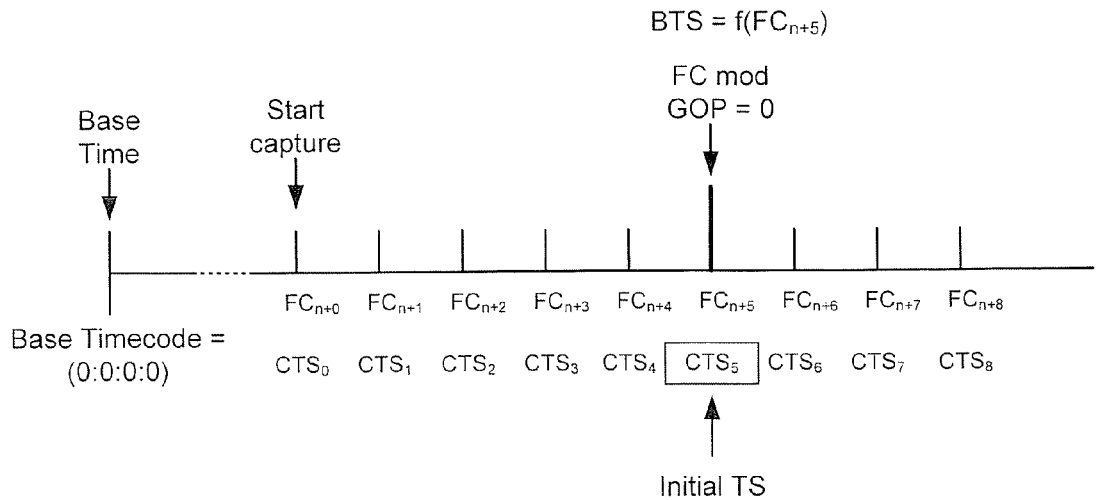
FIGS. 13A and 13B illustrate exemplary embodiments of generating synchronous timestamps.
Figure 13B:
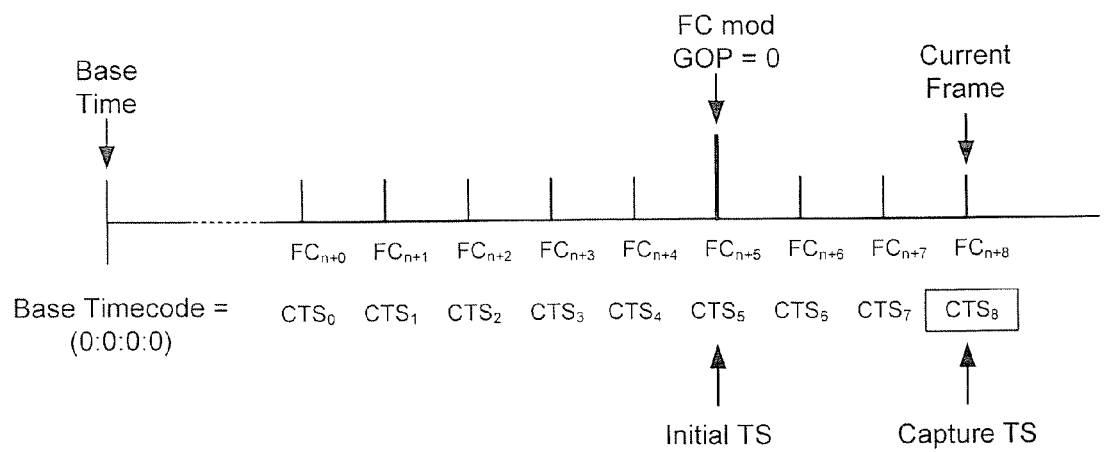

Exemplary embodiments are illustrated in FIGS. 13A and 13B. As shown therein, a Base Time having a Base Time code=(0:0:0:0) is defined. At some later point in time, a capture system begins to capture frames from a video signal. The capture system receives a time code, such as an LTC or VITC time code, that references the Base Time. When the system captures the first frame, it calculates the frame count $FC_n$, which represents the total number of frames that have been in the live video stream since the Base Time (See FIG. 12, Block 215). The first captured frame is then assigned a Frame Count of $FC_{n+0}$. The next frame is assigned a frame count of $FC_{n+1}$, and so on. Each frame is assigned a unique timestamp that is specific to the particular capture system in use. Thus, the first frame is assigned a Capture Timestamp of $CTS_0$ by the capture and encoding subsystem, the second frame is assigned a capture timestamp of $CTS_1$ by the capture and encoding subsystem, and so on. The Capture Timestamp of a system may depend on when the system started receiving frames. Accordingly, the Capture Timestamp may vary from subsystem to subsystem.

Assuming GOP alignment is required, the system checks the Frame Count of each captured frame to determine if the next frame is GOP aligned with frames encoded by the other capture and encode subsystems (i.e., to see if FC mod GOP equals zero). In the example illustrated in FIGS. 13A-B, that condition is not met until the sixth captured frame, which is assigned $FC_{n+5}$. At that point, the Capture Timestamp $CTS_5$ of the frame is taken as the Initial Timestamp. Furthermore, the Base Timestamp is calculated as a function of $FC_{n+5}$, as follows:

$$\text{Base Timestamp} = *10000 * \text{\# of Milliseconds Per Frame} \quad (8)$$

Thus, the Base Timestamp is calculated based on the total number of frames that have been in the live video stream from the Base Time up until the time the Initial Timestamp is stored.

The Encode Frame Timestamp for the initial frame (having Frame Count $FC_{n+5}$) is then calculated from Equation (7) as follows:

$$\text{Encode Frame Timestamp} = \text{Base Timestamp} + (CTS_5 - CTS_5) \quad (9)$$

That is, the Encode Frame Timestamp for the initial frame is simply the Base Timestamp.

Referring to FIG. 13B, the Encode Frame Timestamp for the frame having frame count $FC_{n+8}$ is calculated from Equation (7) as follows:

$$\text{Encode Frame Timestamp} = \text{Base Timestamp} + (CTS_8 - CTS_5) \quad (10)$$

The Encode Frame Timestamp is updated in a similar manner for each successive captured frame using the Base Timestamp, the Initial Timestamp and the Capture Timestamp of the captured frame.

An example using sample numbers in an NTSC video processing system having two capture systems and using a Drop time code is as follows:
NTSC Video: 30/1.001 Frames/Sec
Integer Frame Rate=30
Drop Time code Used
A first system starts capture:
First Captured Frame Time Code (Drop Frame): 01:25:32:07
Total Seconds=1*3600+25*60+32=5132
Total Minutes=5132/60=85
Frame Count=5132*30+7=153967
Frame Count Adjusted for Drop Time code=153967−2*85+2*(85/10)=153813
Base Timestamp=153813*10000*1000*1.001/30=51322271000

A second system starts capture 944 frames later than the first system:
First Captured Frame Time Code (Drop Frame): 01:26:03:23
Total Seconds=5163
Total Minutes=86
Frame Count=154913
Frame Count Adjusted for Drop Time code=154757
Base Timestamp=154757*10000*1000*1.001/30=51637252333

The first frame of the second system has an encode frame timestamp of 51637252333. The 944th frame of the first system will have an encode frame timestamp of: 51322271000+944*10000*1000*1.001/30=51637252333. This illustrates that frames of both streams corresponding to the same source frame have the same timestamp. Therefore, even though they started asynchronously from each other, the two captured streams have frame-accurate synchronous timestamps. Moreover, the output encoded video streams may be GOP aligned. Therefore, switching from one encoded stream to the other encoded stream to accommodate changes in bandwidth is made easier.

Systems/methods according to embodiments of the invention may generate Encode Frame Timestamps in a manner that is computationally efficient, as the Encode Frame Timestamp may be calculated for each frame using only addition/subtraction of the Capture Timestamp, the Initial Timestamp and the Base Timestamp. The Initial Timestamp and the Base Timestamp are generated at the beginning of encoding, and can be stored, for example, in a tightly coupled memory, such as a cache, for quick access. Accordingly, it may not be necessary to calculate a timestamp taking into account drop frames and non-integer frame rates based on the Base Time code each time a new frame is captured. See new FIG. 12

Furthermore, the systems/methods illustrated in FIG. 12 may only require sampling of the time code from the start of capture up to the point of GOP alignment. From that point on, the systems/methods are no longer required to sample the time code. This may be beneficial in cases where source time code may have periods of instability or discontinuities with the source video (for example, if the source of time code fails). In the case where time code is guaranteed to always be available and perfectly synchronous with the source video, a frame's encoded timestamp can be computed as a function of the frame's time code, as illustrated in the systems/methods shown in FIG. 14, below.

Figure 14:
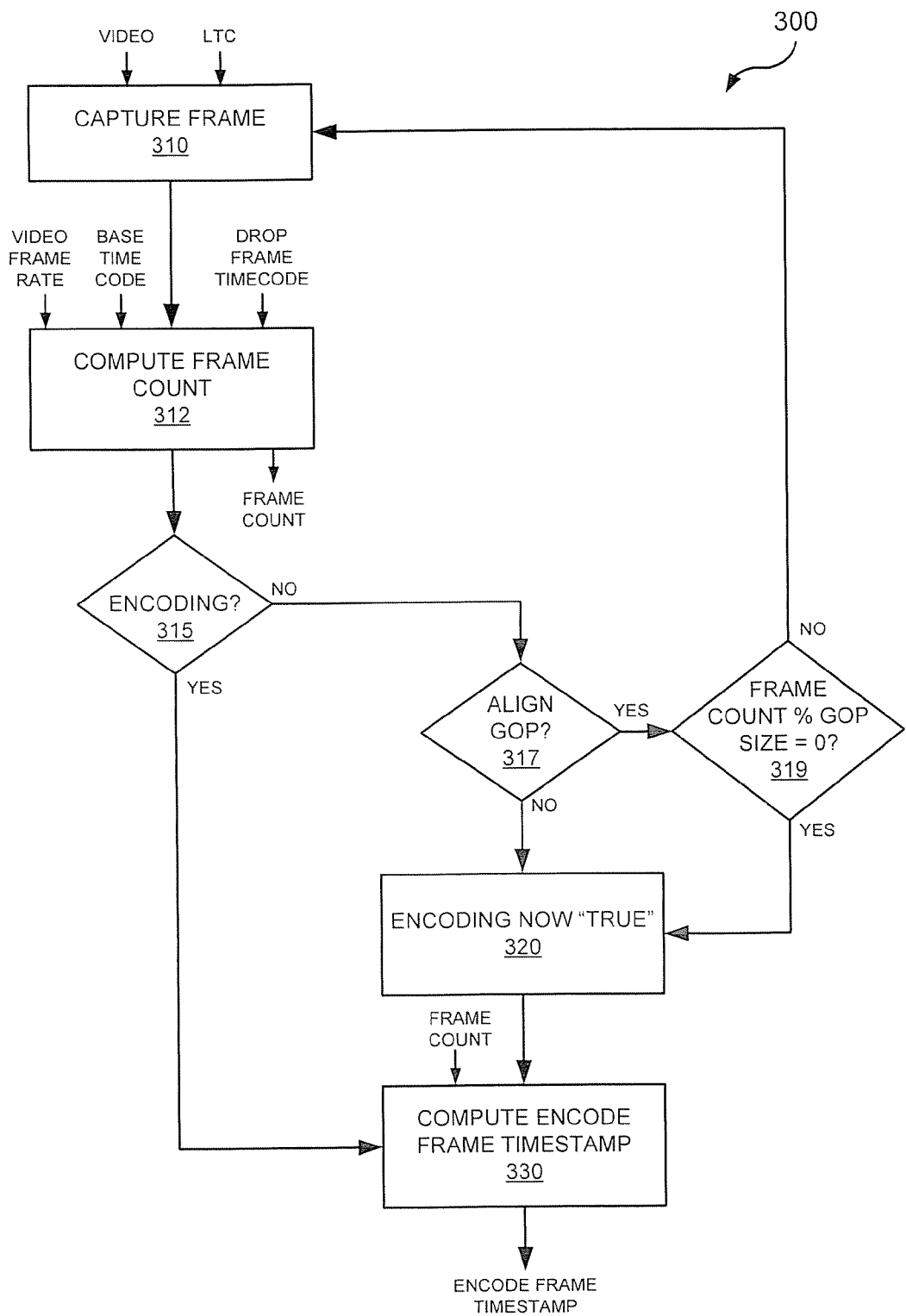
FIG. 14 is a flowchart that illustrates systems/methods for generating synchronous timestamps according to further embodiments.

Systems/methods for generating encode frame timestamps according to further embodiments are illustrated in FIG. 14. Referring to FIG. 14, when a frame of video is captured (Block 310), it is assigned a time code, in this figure obtained from the LTC input. The systems/methods first compute the number of frames (Frame Count) that have been in the live stream since some specific earlier base time, represented by a base time code (Block 312). For illustrative purposes here a base time with a time code of 0:0:0:0 on the same day is assumed, although the use of other base times is possible. To compute the Frame Count, the number of seconds from the base time is calculated first using, information from the LTC timecode, which contains Hours, Minutes. Seconds and Frames (in addition to other data, such as date).

$$\text{Total Seconds} = \text{Hours} * 3600 + \text{Minutes} * 60 + \text{Seconds} \quad (1)$$

$$\text{Total Minutes} = \text{Total Seconds}/60 \quad (2)$$

The Frame Count is then computed as follows. First, the Frame Rate, expressed as an integer number of frames per second, is calculated as follows:

$$\text{(Integer) Frame Rate} = \text{(Integer)}((\text{Double}) \text{ Frame Rate} + 0.5) \quad (3)$$

The Frame Count is then simply the frame rate multiplied by the total number of elapsed seconds since the base time, plus the number of frames from Frames field of the Time code, as follows:

$$\text{Frame Count} = \text{Total Seconds} * \text{Integer Frame Rate} + \text{Frames} \quad (4)$$

If the Time code is not a Drop Frame time code then the Frame Count within a given day accurately represents the total number of frames. However, if the time code is a Drop Frame time code, then the Frame Count is adjusted as follows to account for the periodic frame count drops of Drop Frame time code:

$$\text{Frame Count} = \text{Frame Count} - 2*\text{Total Minutes} + 2*(\text{Total Minutes}/10) \quad (5)$$

In Block 315, the systems/methods determine if encoding is already occurring. If so, then the systems/methods proceed to compute the encode frame timestamp in Block 320. However, if encoding has not yet started, then the systems/methods proceed to Block 317 to determine if GOP alignment is required.

To provide for synchronous GOP structures across multiple encoding systems, a constraint is imposed on the first frame passed from the capture subsystem to the encoding subsystem. This is only needed if GOP alignment is required. This constraint is:

Frame Count mod GOP Size Must Equal 0

This ensures that the first frame that is passed to the encoding system is the first frame of a Group of Pictures.

Thus, after the Frame count is computed in Block 312, if not already encoding, a check is made to see if it is necessary to align the GOPs across multiple encoded streams. If not, operations continue to Block 320. However, if GOP alignment is required, a check is made to see if the current frame is at the beginning of a GOP, by comparing the quantity (Frame Count mod GOP size) to zero (Block 319). If (Frame Count mod GOP size) is zero, then the current frame is at the beginning of a Group of Pictures, and operations proceed to Block 320.

However, if (Frame Count mod GOP size) not zero (i.e., the constraint is not met), then the captured frame is ignored and the operations return to Block 310 where a new frame is captured and the Frame Count is recalculated for the next captured frame.

At Block 320 encoding can start on the current frame.

The final step is to produce the Encode Frame Timestamp (Block 330) that will be the same across all of the encoding systems for any given frame. This is computed from the current frame's frame count and here is produced in HNS units.

$$\text{Timestamp} = \text{Frame Count} * 10000 * \text{\# of Milliseconds Per Frame}$$

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of encoding a live video signal in a video encoding system including a plurality of video capture and encoding subsystems, the method comprising:
    receiving the live video signal and time codes representing when the frames of the live video signal were captured at the plurality of video capture and encoding subsystems;
    starting video capture and encoding in a first one of the plurality of video capture and encoding subsystems at a first frame of the live video signal;
    starting video capture and encoding in a second one of the plurality of video capture and encoding subsystems at a second frame of the live video signal that is later than the first frame;
    generating, separately by both the first and second video capture and encoding systems, encode frame timestamps for the second frame based on the time code corresponding to the second frame and a number of frames that have been in the live video signal since a predefined base time, wherein the encode frame timestamps are synchronized across the first and second video capture and encoding subsystems; and
    encoding, by both the first and second video capture and encoding systems, the encode frame timestamp with the second frame.

2. The method of claim 1, wherein generating the encode frame timestamp in the second video capture and encoding subsystem comprises:
    generating the number of frames for the second frame based on the time code corresponding to the second frame and a predefined base time;
    generating a base timestamp in response to the number of frames;
    generating a capture timestamp for the second frame; and
    storing the capture timestamp for the second frame as an initial capture timestamp.

3. The method of claim 2, further comprising:
    generating a capture timestamp for a third frame received by the second video capture and encoding subsystem after the second frame;
    generating an encode frame timestamp for the third frame in response to the capture timestamp of the third frame, the initial timestamp and the base timestamp; and
    encoding the third frame in the second video capture and encoding subsystem using the encode frame timestamp for the third frame.

4. The method of claim 3, wherein the encode frame timestamp for the third frame is generated according to the equation:

$$\text{encode frame timestamp} = \text{base timestamp} + (\text{capture timestamp} - \text{initial timestamp}).$$

5. The method of claim 2, further comprising:
    determining if the second frame is frame aligned with a group of pictures of an encoded video signal generated by the first video capture and encoding subsystem in response to the live video signal; and
    in response to determining that the second frame is not frame aligned with the group of pictures of the encoded video signal generated by the first video capture and encoding subsystem, discarding the second frame and receiving a subsequent frame in the live video signal.

6. The method of claim 1, wherein the first and second video capture and encoding subsystems are configured to encode the live video signal using different encoding parameters.

7. The method of claim 2, wherein generating the number of frames for the second frame comprises generating the number of frames in response to the time code associated with the second frame, a base time code corresponding to the predefined base time, and a video frame rate.

8. The method of claim 7, further comprising adjusting the number of frames to account for use of a drop time code.

9. The method of claim 8, wherein adjusting the number of frames ("Frame Count") comprises adjusting the number of frames according to the following equation:

Frame Count=Frame Count−2*Total Minutes+2*(Total Minutes/10)

where Total Minutes represents the total number of minutes from the base time code corresponding to the predefined base time to the time code associated with the second frame.

10. The method of claim 1, wherein the time code corresponding to the second frame comprises a linear time code (LTC).

11. A video encoding system, comprising:
first and second video capture and encoding subsystems, wherein each of said first and second video capture and encoding subsystems is configured to receive a live video signal and time codes representing when the frames of the live video signal were captured and comprises a capture subsystem, an adaptive synchronization subsystem, and at least one encoding subsystem;
wherein the first video capture end encoding subsystem is configured to start video capture and encoding at a first frame of the live video signal, and the second video capture end encoding subsystem is configured to start video capture and encoding at a second frame of the live video signal that is later than the first frame: and
wherein the first and second video capture and encoding subsystems are configured to separately generate respective encode frame timestamps for the second frame based on the time code corresponding to the second frame and a number of frames that have been in the live video signal since a predefined base time, and to encode the second frame using the encode frame timestamp, wherein the respective encode frame timestamps are synchronized across the first and second video capture and encoding subsystems.

12. The video encoding system of claim 11, wherein the adaptive synchronization subsystem of the second video capture and encode subsystem is configured:
to generate the number of frames for the second frame based on the time code corresponding to the second frame,
to generate a base timestamp in response to the number of frames,
to generate a capture timestamp for the second frame, and
to store the capture timestamp for the second frame as an initial capture timestamp.

13. The video encoding system of claim 12, wherein the adaptive synchronization subsystem of the second video capture and encode subsystem is further configured to generate a capture timestamp for a third frame received by the second video capture and encoding subsystem after the second frame, and to generate an encode frame timestamp for the third frame in response to the capture timestamp of the third frame, the initial timestamp and the base timestamp: and
wherein the encoding subsystem of the second video capture and encode subsystem is configured to encode the third frame using the encode frame timestamp for the third frame.

14. The video encoding system of claim 13, wherein the adaptive synchronization subsystem of the second video capture and encode subsystem is configured to generate the encode frame timestamp for the third frame according to the equation:

encode frame timestamp=base timestamp+(capture timestamp−initial timestamp).

15. The video encoding system of claim 12, the adaptive synchronization subsystem of the second video capture and encode subsystem is further configured to determine if the second frame is frame aligned with a group of pictures of an encoded video signal generated by the first video capture and encoding subsystem in response to the live video signal and in response to determining that the second frame is not frame aligned with the group of pictures of the encoded video signal generated by the first video capture and encoding subsystem, to discard the second frame and receiving a subsequent frame in the live video signal.

16. The video encoding system of claim 11, wherein the first and second video capture and encoding subsystems are configured to encode the live video signal using different encoding parameters.

17. The video encoding system of claim 12, wherein the adaptive synchronization subsystem of the second video capture and encode subsystem is configured to generate the number of frames for the second frame based on the time code corresponding to the second frame, a base time code corresponding to the predefined base time, and a video frame rate.

18. The video encoding system of claim 17, the adaptive synchronization subsystem of the second video capture and encode subsystem is further configured to adjust the number of frames to account for use of a drop time code.

19. The video encoding system of claim 18, wherein the adaptive synchronization subsystem of the second video capture and encode subsystem is further configured to adjust the number of frames ("Frame Count") comprises adjusting the number of frames according to the following equation:

Frame Count=Frame Count−2*Total Minutes+2*(Total Minutes/10)

where Total Minutes represents the total number of minutes from the base time code corresponding to the predefined base time to the time code associated with the second frame.

20. The video encoding system of claim 11, wherein the time code corresponding to the second frame comprises a linear time code (LTC).

21. A method of encoding a live video signal in a video encoding system including a plurality of video capture and encoding subsystems, the method comprising:
receiving the live video signal and time codes representing when the frames of the live video signal were captured at the plurality of video capture and encoding subsystems;
starting video capture and encoding in a first one of the plurality of video capture and encoding subsystems at a first frame of the live video signal;
starting video capture and encoding in a second one of the plurality of video capture and encoding subsystems at a second frame of the live video signal that is later than the first frame;
determining at the second video capture and encoding subsystem if the second frame of the live video signal is the first frame of a group of pictures being encoded by the first video capture and encoding subsystem;
in response to determining that the second frame of the live video signal is not the first frame of a group of pictures being encoded by the first video capture and encoding subsystem, discarding the second frame of the live video signal and receiving a third frame of the live video signal; and in response to determining that the second frame of the live video signal is the first frame of the group of pictures being encoded by the first video capture and encoding subsystem, generating an encode frame timestamp for the second frame in the second video capture and encoding subsystem based on the time code corresponding to second frame and a number of frames that have been in the live video signal since a predefined base time, wherein the encode frame timestamp for the second frame at the first video capture and encoding subsystem and an encode frame timestamp of the first frame of the group of pictures at the first video capture and encoding subsystem are synchronized.

22. The method of claim 21, further comprising:
encoding the encode frame timestamp with the second frame in the second video capture and encoding subsystem.

23. The method of claim 21, wherein generating the encode frame timestamp for the second frame of the live video signal comprises generating the number of frames associated with the second frame of the live video signal and generating the encode frame timestamp in response to the number of frames.

24. The method of claim 21, wherein determining if the second frame of the live video signal is the first frame of a group of pictures (GOP) being encoded by the first video capture and encoding subsystem comprises generating the number of frames associated with the second frame of the live video signal and performing a modulus operation on the number of frames and a GOP size.

\* \* \* \* \*